Figure 1:
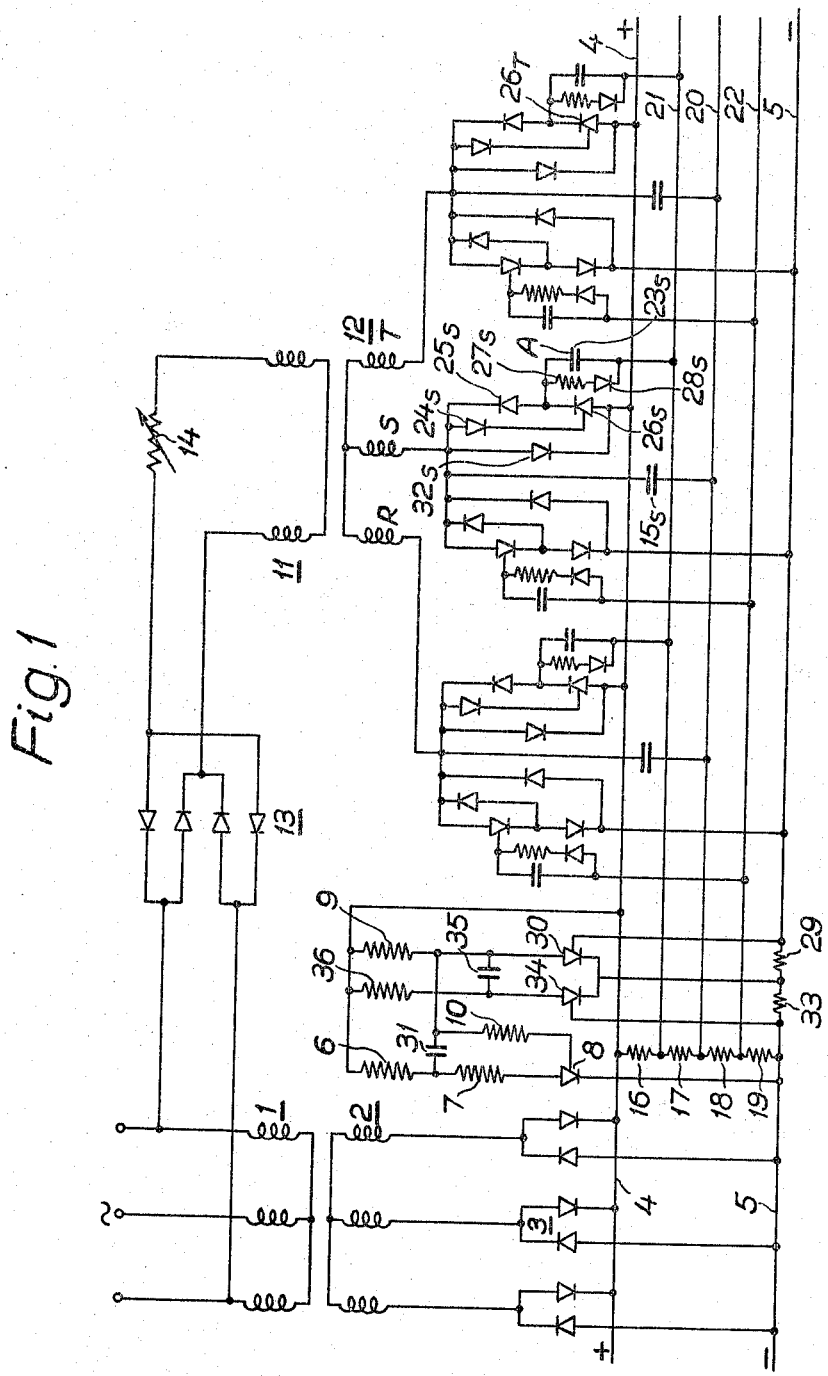

United States Patent Office 3,327,189
Patented June 20, 1967

3,327,189
DRIVING DEVICE CONTAINING A FIRST AND A SECOND ELECTRODYNAMIC SYSTEM
Hans Hedstrom, Vasteras, Sweden, assignor to Allmänna Svenska Elektriska Aktiebolaget, Vasteras, Sweden, a corporation of Sweden
Filed Apr. 21, 1964, Ser. No. 361,362
Claims priority, application Sweden, Apr. 24, 1963, 4,466/63
10 Claims. (Cl. 318—44)

The present invention relates to a driving device containing an asynchronous motor whose slip power is made use of.

With a known driving device of this kind the secondary winding of an asynchronous machine is connected to an alternating current network through a converter connection in such a way that the slip power is fed back into the net. When the machine operates with down-regulated speed as a motor and drives the load, the network receives power from the secondary winding. An increase of the speed above the desired set speed means that the machine works as an asynchronous generator and delivers power to the network through the primary winding, braking thereby being effected. With this driving device however a large number of current valves dimensioned for a relatively large power are required, together with regulator transformers or the like, and the asynchronous machine must be provided with slip rings.

A driving device according to the invention is as versatile in operaton as the above-named known device and is in addition cheaper to manufacture. The invention is based on the principle of converting the slip power in an asynchronous motor to mechanical power in a motor connected to the secondary winding which is mechanically connected to the axle of the asynchronous motor.

A driving device according to the invention contains a first and a second electrodynamic system, each containing a stator winding and a rotor winding, and is characterised in that the two rotor windings are made like rotor windings in asynchronous machines and arranged to rotate with a fixed mutual speed ratio, and that at least the stator winding of said first system is made like the stator winding in an asynchronous machine and connected to an alternating current network, and that the two rotor windings are connected through rectifier equipment to two direct current bars in a way known per se for rectifying, while at least the one rotor winding is in addition connected to the direct current bars through controlled current valves in inverter connection, which are supplied with a control voltage, the frequency of which is equal to the frequency of the induced voltage in the same rotor winding, and that the current in at least the one stator winding is variable by means of a member intended for speed control, such as a rheostat connected to the stator winding.

With a driving device according to the invention, the rectifier equipment and converters in the device, at full driving or braking torque, only carry half as much current as corresponding equipment in the known device, if the power is the same in both cases. Further no transformers are necessary as speed regulation is effected by means of a variable impedance connected to a stator winding.

Figure 2:
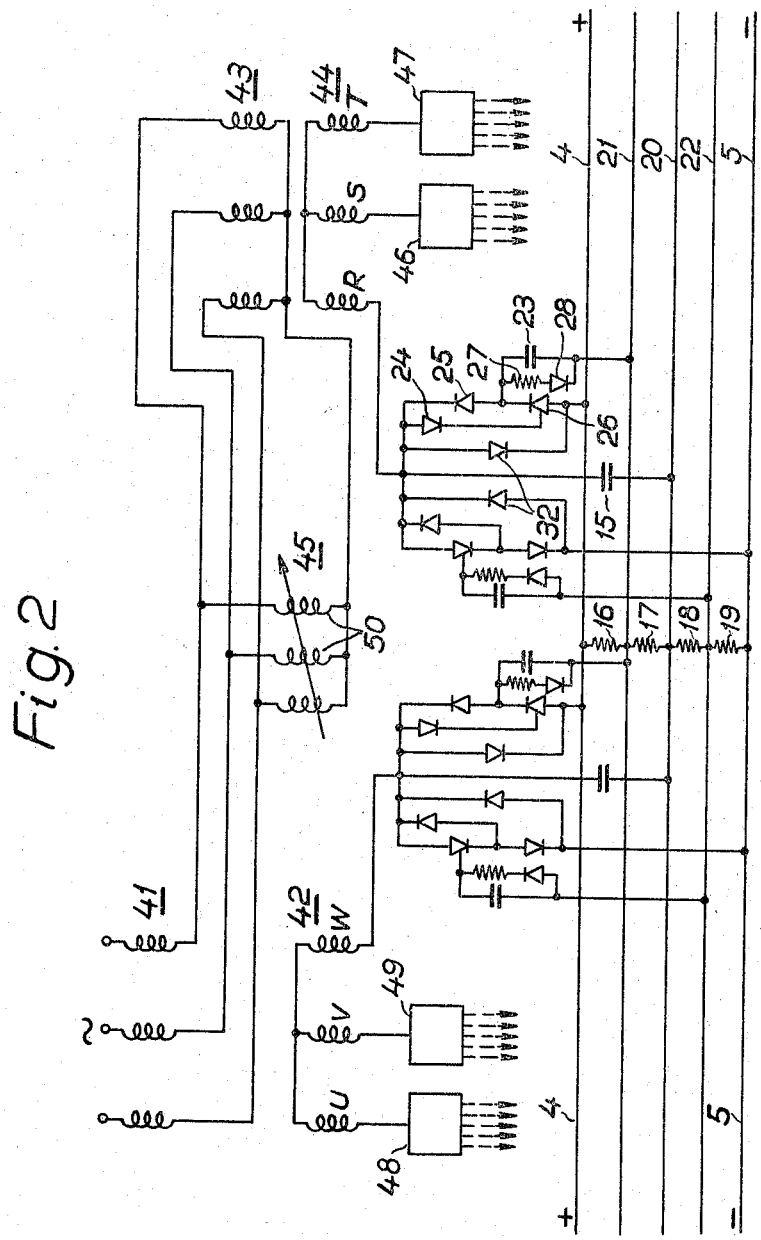
Figure 4:
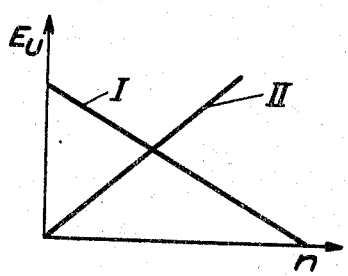
Figure 5:
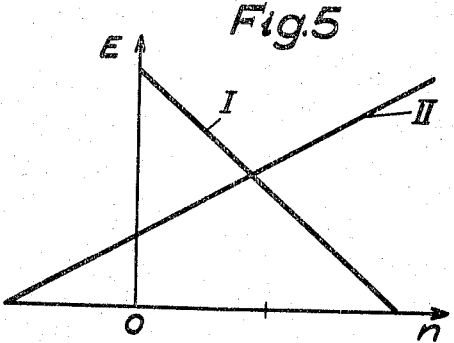

The invention will be described in the following with reference to the accompanying schematical drawings, whre FIGURES 1 and 2 show two different embodiments of a driving device according to the invention, and FIGURE 3 graphically shows the voltage in the winding phases connected to the inverter connections. FIGURES 4 and 5 show for two different embodiments of the invention the induced rotor voltages as a function of the speed.

In FIGURE 1, 1 indicates the three phases of the primary winding of an asynchronous motor which are connected to an alternating current network. The windings 2 are the three phases of the secondary winding of the same motor. In series with the secondary winding are the diodes 3, which rectify the current from the secondary winding to the direct current bars 4 and 5, where 4 is the positive and 5 is the negative pole. Between 4 and 5 the resistances 6 and 7 are connected in series with the thyristor 8. Through the charging resistor 9 and the protection resistor 10 connected thereto a current flows, when the primary winding 1 is connected to the network, which is capable of igniting thyristor 8. Current flows then through the resistors 6 and 7, which are dimensioned so that the motor receives a suitable starting torque. The motor is in this way brought into rotation.

The windings 11 are magnetising windings in an auxiliary motor, the working winding 12 of which lies in the rotor and is three-phase. The two rotors 2 and 12 are mechanically connected to each other. The magnetising winding 11 is fed with direct current from the diodes 13 and the size of the direct current can be adjusted by means of the adjustable resistance 14. When the motor aggregate rotates, a voltage is induced in the windings 12 which with constant current in the winding 11 is proportional to the speed of rotation. By means of the capacitors 15 the potential position of the winding phases is maintained in relation to the mid potential between positive bar 4 and negative 5 bar. The middle potential, that is the potential on the bar 20, is determined by the four series-connected resistances 16, 17, 18 and 19, where 16 and 19 are alike and 17 and 18 are also alike.

The winding phases R, S, T are connected to the direct current bars 4 and 5 and the auxiliary bars 20, 21, 22 each through its valve group containing thyristors and capacitors. The valve groups are exactly alike in construction and manner of connection and constitute a three-phase inverter. Each valve group contains a plus-part, a capacitor connected between the winding phases and the middle bar 20, and a minus-part, the components of which are the same as in the plus-part, and which correspond to this functionally.

The rectified current from the winding 2 can be fed into the working winding 12 through the valve groups connected to the winding phases R, S, T. The resistance of the resistor 17 is chosen to correspond to 30 to 35% of the total resistance of the series connected resistors 17 and 16. The auxiliary bar 21 thereby receives a potential which lies 30 to 35% above the potential of the middle bar 20. The two plates of the capacitor 23S have from the beginning the same potential. When the potential on phase terminal S of the winding 12 by means of induction has a higher value than the potential on the capacitor 23S a current can flow from the terminal through the diode 24S and to the ignition pole on the thyristor 26S, and from there to the capacitor 23S. The thyristor 26S then ignites and, if the rectified voltage from winding 2 is higher than rectified voltage from winding 12, a current flows from positive bar for into winding phase S, so that the machine 11–12 receives starting moment. In a similar way a current occurs in one of the two remaining phases, flowing from that phase to the negative bar 5.

Figure 3:
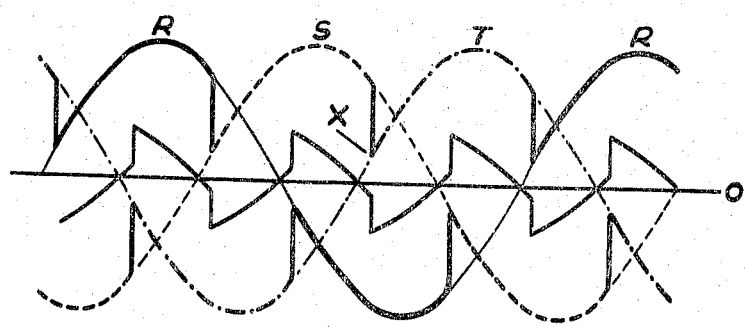

The sinusoidal curves R, S, T on FIGURE 3 represent the voltages on the terminals of the phases R, S, T. The voltages are laid out along the ordinate axis, and the time along the abscissa axis. The thickly drawn curve parts correspond to current conducting intervals. The curve M represents the potential of the middle bar 20 when the Y-point of the winding 12 has the potential 0.

When the voltage applied through the diodes 3 over the current bars 4 and 5 is higher than the counter voltage from the winding 12, a current flows from the bar 4 to the phase S in winding 12. At the time $x$ the potential difference between the phase terminal T in winding 12 and the bar 21 is positive and thyristor 26T ignites in the same way as thyristor 26S ignited 120 electrical degrees earlier. Since the voltage is then considerably lower in phase T than in phase S, the current through the thyristor 26S connected to phase S will be zero and the thyristor ceases to be conducting. It cannot re-ignite until the capacitor 23S has reached the potential of the bar 21 on plate A, which occurs through charging resistor 27S and diode 28S.

When the machine 11–12 receives current a voltage drop will occur over the resistance 29 and thyristor 30 ignites. Thereby capacitor 31 (which has been charged through charging resistance 9) is discharged and thyristor 8 becomes currentless and ceases thereby to be conducting, whereby the circuit containing the resistors 6 and 7 is opened.

The motor winding 12 takes up the slip power from the rotor winding 2, and the electrodynamic system 11, 12 works as a motor with a speed which is determined by the magnetising current in the winding 11. The higher the magnetization, the lower the speed. If the machine is driven by external power up to such a high speed that the induced voltage over the terminal of windings 12 is higher than the induced voltage over 2, no power can flow in direction from 2 to 12. The current changes direction in the collection bars 4 and 5 and will flow from winding 12 to the resistors 16–19 through the diodes 32. Over resistor 33 a voltage drop occurs which gives an ignition impulse to the thyristor 34, which in series with the relatively high-ohmic resistor 36 is connected across the direct current bars, and which discharges the capacitor 35 and thereby extinguishes the thyristor 30. The thyristor 8 then ignites and the resistors 6 and 7 become current-carrying. The machine 11, 12 functions as a brake, the machine 1, 2 is idle. If the over-speed ceases the current reverse and thyristor 30 is again conducting as described earlier.

Since the slip power is made use of—if half the synchronous speed of the main motor 1, 2 is chosen as highest speed of the aggregate—the power for thyristors and diodes will be half the maximum power obtained per phase. The aggregate may consist of two quite separate machines mechanically connected to each other, slip rings being then required on both rotors. However the thyristors are controlled by the induced voltage in winding 12, and therefore thyristors, diodes and other components belonging to the rotor circuit may suitably rotate with it. The windings 1 and 11 can be laid in the same grooves in a common stator core, for which the pole number ratio 1:2 would be suitable. In the rotors the winding 2 and the winding 12 should then lie in the same grooves in the rotor core. A machine arranged thus contains neither slip rings nor brushes and is speed-regulated without other external equipment than the diodes 13 and the resistor 14.

In FIGURE 4 the curve I repesents induced E.M.F. in windings 2 as function of the speed and II a corresponding curve for the winding 12. As long as the curve I lies higher than the curve II, the driving system gives a driving torque, and when the curve II lies higher than I driving devices work as a brake. The machine 11, 12 works then as a generator and delivers power to the series-connected parts 6 and 7 of the load resistance. By varying the current in the stator winding 11, the curve II can be given different inclination angles and thus the desired speed can be set.

Particularly when relatively large amounts of energy are to be converted during braking, the embodiment shown in FIGURE 2 is more advantageous than that described above, since even the braking power is made use of. In FIGURES 2 and 2a 41 indicates the stator winding in a first asynchronous machine and 42 the rotor winding. The phase windings of the winding 41 are series-connected with the phase windings of the stator winding 43 in a second asynchronous machine, the rotor winding of which is indicated by 44. The stator phases are series-connected with each other in such a way that the two stator fields have different directions of rotation in relation to the rotation direction of the shaft, and the three series groups are Y-connected and connected to an alternating current network. The stator winding 43 is connected to a control device 45, containing variable impedances parallel-connected with each of the winding phases in the winding 43. The two rotors are mechanically connected with each other, as shown in FIGURE 2a where 51 and 53 indicate the stator bodies supporting the windings 41 and 43 respectively, and 52 and 64 the rotor bodies supporting the windings 42 and 44 respectively. The rotors 52 and 64 are mounted on a common shaft 72, 4 and 5 indicate positive and negative direct current insert and 20, 21 and 22 auxiliary bars, the potentials of which in relation to the direct current bars 4 and 5 are determined in the same way as in FIGURE 1 by their connections to the series-connected resistors 16, 17, 18, 19 between the bars 4 and 5.

The rotor winding 44 is connected with its phases R, S, T to the bars 4, 5, 20, 21, 22 in exactly the same way as for the embodiment shown in FIGURE 1. The current valve group connected to the phases S and T which are exactly like the first-named group are only indicated by the symbols 46 and 47.

In contrast to the embodiment shown in FIGURE 1, the two rotor windings 42 and 44, are here connected to the bars in the same way, that is the phases U, V, W of the rotor winding 42 are connected to main and auxiliary bars in exactly the same way as the phases R, S, T. In the figure only the current valve group connected to the phase W is shown, while the groups connected to the phases U and V are indicated by the symbols 48 and 49.

In the rotor winding 44 the E.M.F. necessary for inverter control is induced even at standstill, and therefore the valve groups connected to the phases R, S, T can carry out their inverter function from the start up of the driving device. No starting resistance connected to the rotor winding 42 is thus needed since the starting current supplied from this winding to the bars 4 and 5 is inverted and supplied to the winding 44. The control device 45 may at start-up be adjusted to maximum impedance value, and thus the machine 43, 44 can also contribute fully to the starting torque of the driving device. The desired speed is attained by setting a suitable impedance value on the variable inductance coils 50 in the control device 45. If the speed exceeds the set speed, the E.M.F. induced in the winding 44 will predominate in comparison with the E.M.F. induced in the winding 42. The thyristors in the current valve groups connected to the phases R, S, T do not receive the necessary ignition voltage and cease to ignite, and conduction of current is taken over by the diodes in the current valve groups connected between the phase windings and the direct current bars. In the figure such diodes connected to the phase windings R are shown and indicated by 32. The power transferred from the winding 44 to the direct current bars 4 and 5 is inverted in the current valve groups connected to the winding 42 and the thyristors of the valve groups connected to winding 42 are supplied with a control voltage with the same frequency as the E.M.F. induced in winding 42. The asynchronous machine 41, 42 works then as a generator and feeds braking power back to the network.

In FIGURE 5 induced E.M.F. in the machine 41, 42 is represented by curve I, and in the machine 43, 44 by curve II.

At different settings of the control device 45, the steepness for the curve II is changed and to a lesser degree also for the curve I, different speeds being thereby set.

I claim:

1. An alternating current driving means comprising a first and a second electrolynamic system, each comprising a stator winding and a rotor winding, the rotatable parts of said first and second electrodynamic system being mechanically connected to each other, said driving means further comprising at least one variable impedance element, a voltage divider having end terminals and a plurality of intermediate terminals, and two rectifier means each connected to one of said rotor windings for rectifying the current thereof, direct current bars and two inverter means each connected between said bars and one of said rotor windings, each inverter means comprising controlled current valves, said rotor windings and at least one of the stator windings constituting phase windings, control circuits to supply to said controlled current valves a control voltage the frequency of which is equal to the frequency of the induced voltage in the rotor winding connected to the valve, said voltage divider having its end terminals connected between said direct current bars, each of said control circuits being connected between a corresponding rotor phase and one of said intermediate terminals of the voltage divider, said variable impedance element being connected to at least one of said stator windings.

2. An alternating current driving means as claimed in claim 11, comprising a first resistor connected directly across said bars and furnished with end terminals, a middle terminal and one terminal between the middle terminal and each of the end terminals, the inverter means each comprising a plurality of current valve groups, each group being connected to a rotor phase; first to sixth diodes, each current valve group comprising a first controlled valve connected in series with the first diode between the positive direct current bar and the rotor phase, and a second controlled valve connected in series with the second diode between the rotor phase and the negative direct current bar, a second resistor, a first capacitor, said first controlled valve having its control electrode connected to the rotor phase through the third diode and having its current output side connected to the terminal of the first resistor lying between said middle terminal and the positive bar through said second resistor and said fourth diode, the rotor phase being connected to said second resistor and fourth diode being series connected across said first capacitor, the current output side of said second controlled valve through said fifth diode and to the current input of the second valve directly, a third resistor, the control electrode of the second valve being connected to the terminal lying between said middle terminal and the negative direct current bar through said sixth diode and said third resistor, a second capacitor, said sixth diode and said third resistor being series connected across said second capacitor.

3. An alternating current driving means as claimed in claim 1, the stator windings of both electrodynamic systems constituting phase windings, the inverter means connecting both the rotor windings to the direct current bars, the control frequency of each current valve being equal to the frequency of the induced voltage in the rotor winding connected to the same current valve.

4. An alternating current driving means as claimed in claim 3, each winding phase in one stator winding being series connected with a winding phase in the other stator winding, the winding phases in one of the stator windings being connected in parallel with said variable impedance element, the rotating fields generated by the stators having opposite rotational directions.

5. An alternating current driving means as claimed in claim 1, the two electrodynamic systems being constructed with different pole numbers.

6. An alternating current driving means as claimed in claim 1, the two electrodynamic systems having common magnetic cores.

7. An alternating current driving means as claimed in claim 1, comprising only one inverter means, said second electrodynamic system having a direct current magnetised stator winding connected to the inverter means, a load resistance, and means connecting the load resistance to the direct current bars.

8. An alternating current driving means as claimed in claim 7, means responsive to the current and voltage of the direct current bars to control said last connecting means, the voltage induced in the rotor winding of said first electrodynamic system at standstill and supplied to the direct current bars giving an impulse for connecting said load resistance as a starting resistance for said first electrodynamic system, while power supplied from the direct current bars to said second electrodynamic system produces disconnection of this resistance, while power supplied from said second dynamic system to the direct current bars results in reconnection of the resistance through the direct current bars and thereby operates as braking resistance for said second electrodynamic system.

9. An alternating current driving means as claimed in claim 7, said connecting means comprising a first thyristor connected in series with said load resistance over the direct current bars, a resistive connection connecting the control electrode of said first thyristor to one of the direct current bars resistive elements, and third thyristors each connected across the direct current bars in series with one of said resistive elements, resistance means connected in one of said direct current bars, the control voltage of said second and third thyristor being generated in voltage drops across said resistance means, first and second capacitors, said third thyristor being connected with the load resistance through said first capacitor and with said second thyristor over said second capacitor.

10. An alternating current driving means as claimed in claim 1, the components electrically connected to the rotor windings being carried by the rotating part of the driving means.

References Cited

UNITED STATES PATENTS 2,201,006    5/1950    Kilgore _____ 318—237 X
2,214,563    9/1940    Mittag _____ 318—237 X

FOREIGN PATENTS 941,163    11/1963    Great Britain.

ORIS L. RADER, *Primary Examiner.*

G. Z. RUBINSON, *Assistant Examiner.*